US012423632B2

(12) United States Patent
Shao et al.

(10) Patent No.: US 12,423,632 B2
(45) Date of Patent: Sep. 23, 2025

(54) METHODS AND INTERNET OF THINGS (IOT) SYSTEMS FOR MAINTENANCE MANAGEMENT OF SMART GAS CALL CENTER

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yongzeng Liang, Chengdu (CN); Junyan Zhou, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 235 days.

(21) Appl. No.: 18/306,215

(22) Filed: Apr. 24, 2023

(65) Prior Publication Data
US 2023/0259849 A1     Aug. 17, 2023

(30) Foreign Application Priority Data
Mar. 24, 2023  (CN) .......................... 202310295746.9

(51) Int. Cl.
*G06Q 10/06*      (2023.01)
*G06Q 10/0631*    (2023.01)
*G16Y 10/35*      (2020.01)

(52) U.S. Cl.
CPC ........ *G06Q 10/06315* (2013.01); *G16Y 10/35* (2020.01)

(58) Field of Classification Search
CPC ..... G06Q 10/063112; G06Q 10/06315; G06Q 50/06; G06Y 10/35
See application file for complete search history.

(56) References Cited

U.S. PATENT DOCUMENTS 7,027,924 B2 * 4/2006 Spoonhower .......... G01N 21/31
                                                    356/301
10,887,463 B1 * 1/2021 Leavitt ................ H04M 3/5191
(Continued)

FOREIGN PATENT DOCUMENTS

CN       111147676 A  *  5/2020  ......... G06F 16/3329

OTHER PUBLICATIONS

Zhang S, Tong F, Li M, Jin S, Li Z. Research on multi-dimensional optimal location selection of maintenance station based on big data of vehicle trajectory. Entropy. Apr. 21, 2021;23(5):495. (Year: 2021).*

(Continued)

Primary Examiner — Hamzeh Obaid
(74) Attorney, Agent, or Firm — Metis IP LLC

(57) ABSTRACT

The embodiments of the present disclosure provide methods and Internet of Things (IoT) systems for maintenance management of a smart gas call center. The method includes: obtaining call consultation data information of a gas user; generating a multi-dimensional location evaluation value of an agent to be evaluated based on the call consultation data information, wherein the agent to be evaluated locates a gas fault type based on the call consultation data information; generating a multi-dimensional maintenance evaluation value of a maintainer to be evaluated based on the call consultation data information, wherein the maintainer to be evaluated performs maintenance based on the gas fault type; and adjusting a work order processing scope of the maintainer to be evaluated and the agent to be evaluated based on the multi-dimensional maintenance evaluation value and the multi-dimensional location evaluation value.

12 Claims, 5 Drawing Sheets

(56) References Cited

U.S. PATENT DOCUMENTS

| | | | | |
|---|---|---|---|---|
| 2010/0250312 | A1* | 9/2010 | Tarabzouni | G06Q 50/06 |
| | | | | 709/200 |
| 2020/0160252 | A1* | 5/2020 | Sahni | G06Q 10/063112 |
| 2020/0160264 | A1* | 5/2020 | Silverman | G06Q 10/06315 |
| 2020/0210965 | A1* | 7/2020 | Garber | G06Q 10/04 |
| 2020/0293997 | A1* | 9/2020 | Shao | G08B 21/18 |
| 2021/0248618 | A1* | 8/2021 | Ionescu | G06Q 30/016 |
| 2022/0303380 | A1* | 9/2022 | Martin | H04W 4/90 |
| 2023/0103433 | A1* | 4/2023 | Umakanth | G06Q 10/063118 |
| | | | | 705/7.15 |

OTHER PUBLICATIONS

Wang J, Shuai Y, Feng C, Zhang P, Wang T, Lin N, Liu Z. Multi-dimensional mechanical response of multiple longitudinally aligned dents on pipelines and its effect on pipe integrity. Thin-Walled Structures. Sep. 1, 2021;166:108020. (Year: 2021).*

* cited by examiner

METHODS AND INTERNET OF THINGS (IOT) SYSTEMS FOR MAINTENANCE MANAGEMENT OF SMART GAS CALL CENTER

CROSS-REFERENCE TO RELATED APPLICATION

This application claims priority of Chinese Patent Application No. 202310295746.9 filed on Mar. 24, 2023, the contents of which are entirely incorporated herein by reference.

TECHNICAL FIELD

The present disclosure relates to the field of gas maintenance management, and in particular, to methods and Internet of Things (IoT) systems for maintenance management of a smart gas call center.

BACKGROUND

Gas is flammable and explosive, yet widely used. Gas users call to consult gas call center agents who then determine gas faults and dispatch corresponding maintainers to repair them. In this way, the problems associated with the use process of gas users can be solved to ensure normal gas use. However, given the prior art, the customer service staff who answer calls from gas users for fault location and maintainers who are dispatched based on the fault location are usually randomly assigned. As different customer service staff have different abilities to locate gas faults and gas fault types each maintainer particularly specializes in, there may be a situation where the work order processing scope of the maintainer and the agent does not match according to individual abilities, leading to customer complaints.

In order to solve the problem of automatic matching of work orders with qualified agents, CN2019108789850 discloses a system for rapid fault reporting and automatic circulation of a work order. The work order release module automatically matches the appropriate person in charge of processing through multi-dimensional comparison (e.g., comparison of work content, shift schedule, and workload). The work order matching process of the system does not involve the mismatch between the work order processing scope of the maintainer and the agent and their own abilities, and thus the rate of customer complaints can be improved.

Therefore, it is desirable to provide a method and an Internet of Things (IoT) system for maintenance management of a smart gas call center. The work order processing scope of the maintainer to be evaluated and the agent to be evaluated can better match their own abilities, thereby enhancing the location accuracy and the maintenance quality, and ultimately improving the satisfaction of gas users.

SUMMARY

One or more embodiments of the present disclosure provide a method for maintenance management of a smart gas call center. The method may be implemented based on an Internet of Things (IoT) system for maintenance management of a smart gas call center. The IoT system may comprise a smart gas user platform, a smart gas service platform, and a smart gas management platform which interact in sequence. The method may be performed by a processor of the smart gas management platform, comprising: obtaining call consultation data information of a gas user through the smart gas service platform based on the smart gas user platform; generating a multi-dimensional location evaluation value of an agent to be evaluated based on the call consultation data information, wherein the agent to be evaluated locates a gas fault type based on the call consultation data information; generating a multi-dimensional maintenance evaluation value of a maintainer to be evaluated based on the call consultation data information, wherein the maintainer to be evaluated performs maintenance based on the gas fault type; and adjusting a work order processing scope of the maintainer to be evaluated and the agent to be evaluated based on the multi-dimensional maintenance evaluation value and the multi-dimensional location evaluation value.

One or more embodiments of the present disclosure provide an Internet of Things (IoT) system for maintenance management of a smart gas call center. The IoT system may comprise a smart gas user platform, a smart gas service platform, and a smart gas management platform which interact in sequence. The smart gas management platform may be configured to: obtain call consultation data information of a gas user through the smart gas service platform based on the smart gas user platform; generate a multi-dimensional maintenance evaluation value of a maintainer to be evaluated based on the call consultation data information; generate a multi-dimensional location evaluation value of an agent to be evaluated based on the call consultation data information; and adjust a work order processing scope of the maintainer to be evaluated and the agent to be evaluated based on the multi-dimensional maintenance evaluation value and the multi-dimensional location evaluation value.

One or more embodiments of the present disclosure provide a non-transitory computer-readable storage medium storing computer instructions. When reading the computer instructions in the storage medium, a computer may implement the method for maintenance management of the smart gas call center.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
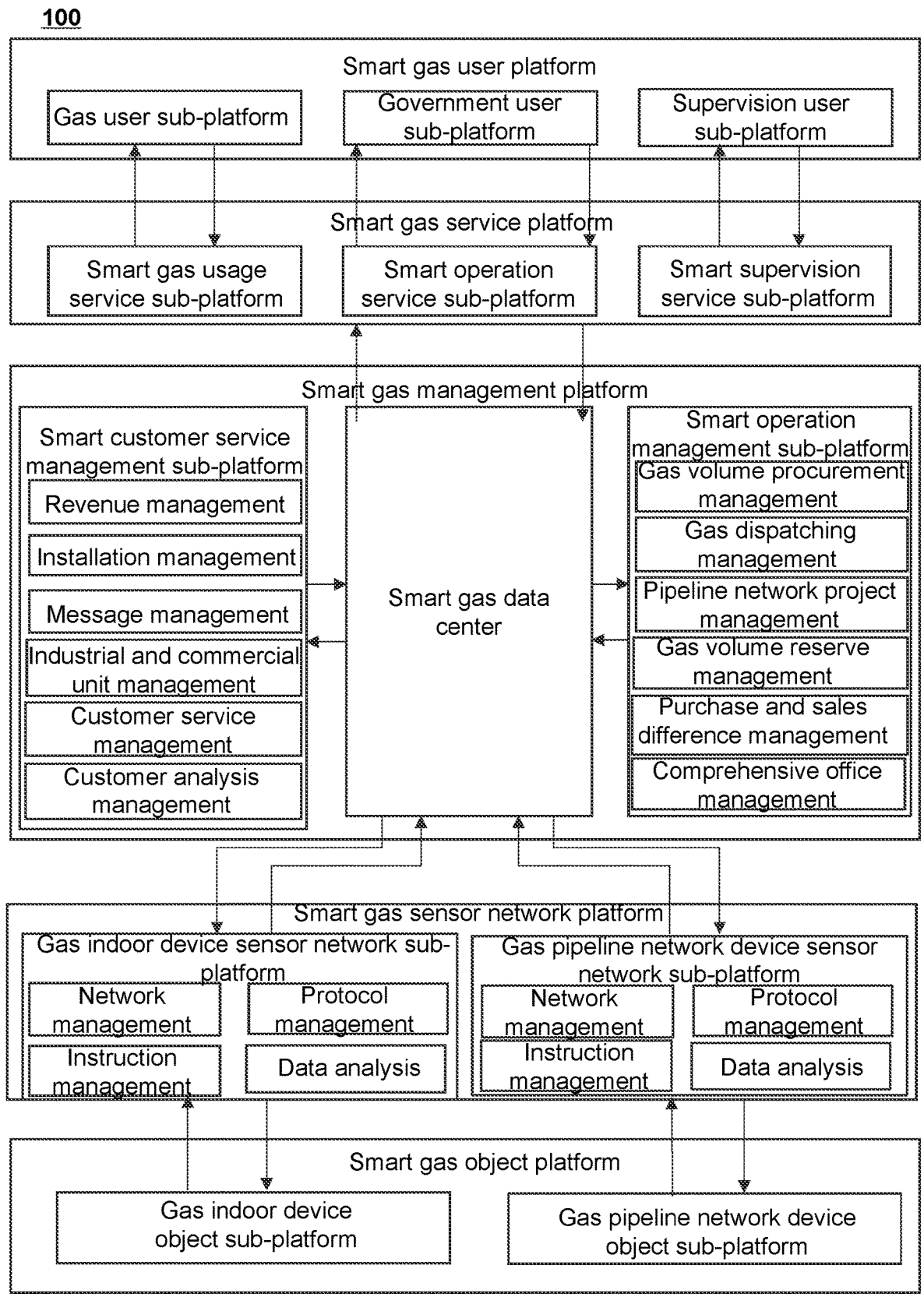
FIG. 1 is a schematic diagram illustrating an application scenario of an Internet of Things (IoT) system for maintenance management of a smart gas call center according to some embodiments of the present disclosure.

The technical solutions of the present disclosure embodiments will be more clearly described below, and the accompanying drawings need to be configured in the description of the embodiments will be briefly described below. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation. As shown in the present disclosure and claims, unless the context clearly prompts the exception, "a", "one", and/or "the" is not specifically singular, and the plural may be included. It will be further understood that the terms "comprise," "comprises," and/or "comprising," "include," "includes," and/or "including," when used in the present disclosure, specify the presence of stated steps and elements, but do not preclude the presence or addition of one or more other steps and elements thereof.

The flowcharts are used in present disclosure to illustrate the operations performed by the system according to the embodiment of the present disclosure. It should be understood that the front or rear operation is not necessarily performed in order to accurately. Instead, the operations may be processed in reverse order or simultaneously. Moreover, one or more other operations may be added to the flowcharts. One or more operations may be removed from the flowcharts.

FIG. 1 is a schematic diagram illustrating an Internet of Things (IoT) system for maintenance management of a smart gas call center according to some embodiments of the present disclosure.

As shown in FIG. 1, in some embodiments, an IoT system 100 for maintenance management of a smart gas call center may include a smart gas user platform, a smart gas service platform, a smart gas management platform, a smart gas sensor network platform, and a smart gas object platform.

In some embodiments, the IoT system 100 for maintenance management of the smart gas call center may be applied to various application scenarios such as maintenance management. In some embodiments, the IoT system 100 for maintenance management of the smart gas call center may obtain call consultation data information of a gas user based on the smart gas user platform through the smart gas service platform. Multi-dimensional location evaluation values of an agent to be evaluated may be generated based on the call consultation data information. The agent to be evaluated may locate a gas fault type based on the call consultation data information. Multi-dimensional maintenance evaluation values of a maintainer to be evaluated may be generated based on the call consultation data information. The maintainer to be evaluated may perform maintenance based on the gas fault type. A work order processing range of the maintainer to be evaluated and the agent to be evaluated may be adjusted based on the multi-dimensional maintenance evaluation values and the multi-dimensional location evaluation values.

The various application scenarios of maintenance management may include location of the gas fault type by an agent of a gas company, maintenance of a gas fault by a maintainer, and adjustment of the work order processing range of the maintainer and the agent, etc. It should be noted that the above scenarios are only examples, and do not limit the specific application scenarios of the IoT system 100 for maintenance management of the smart gas call center. Those skilled in the art may apply the IoT system 100 for maintenance management of the smart gas call center to any other suitable scenarios on the basis of the content disclosed in this embodiment.

The IoT system 100 for maintenance management of the smart gas call center may be described in detail hereinafter.

The smart gas user platform may be a platform for interacting with a user. In some embodiments, the smart gas user platform may be configured as a terminal device. For example, the terminal device may include a mobile device, a tablet computer, etc., or any combination thereof. In some embodiments, the smart gas user platform may be configured to feed back gas usage data and a gas problem solution to the user. In some embodiments, the smart gas user platform may be provided with a gas user sub-platform, a government user sub-platform, and a supervision user sub-platform. The gas user sub-platform may be oriented to a gas user, providing information on the gas usage data and the gas problem solution, etc. The gas user may refer to a user who use gas (e.g., an industrial gas user, a commercial gas user, a general gas user, etc.). In some embodiments, the gas user sub-platform may correspond to and interact with a smart gas usage service sub-platform to obtain a safe gas usage service. The government user sub-platform may provide a government user with gas operation data. The government user may refer to a user of a department related to government gas operation. In some embodiments, the government user sub-platform may correspond to and interact with a smart operation service sub-platform to obtain a gas operation service. The supervision user sub-platform may be oriented to a supervision user to supervise an operation of the IoT system 100 for maintenance management of the smart gas call center. The supervision user may refer to a user of a safety department. In some embodiments, the supervision user sub-platform may correspond to and interact with a smart supervision service sub-platform to obtain a safety supervision requirement service. In some embodiments, the smart gas user platform may carry out bidirectional interaction with the smart gas service platform downwards, send call information of the gas user, etc., to the smart gas service sub-platform, and receive customer service feedback information uploaded by the smart gas usage service sub-platform. In some embodiments, the smart gas user platform may send a gas maintenance management information query instruction to the smart operation service sub-platform; and receive gas maintenance management information uploaded by the smart operation service sub-platform. The gas maintenance management information may include evaluation information, scheduling information, etc., of the maintainer and/or agent.

The smart gas service platform may be a platform configured to receive and transmit data and/or information. For example, the smart gas service platform may receive the gas maintenance management information query instruction sent by the government user sub-platform, and send the gas maintenance management information to the government user sub-platform. In some embodiments, the smart gas service platform may be provided with a smart gas usage service sub-platform, a smart operation service sub-platform, and a smart supervision service sub-platform. In some embodiments, the smart gas service platform may interact with the smart gas management platform. For example, the smart gas service platform may interact with the smart gas management platform downwards, send the gas maintenance management information query instruction to the smart gas data center, and receive the gas maintenance management information uploaded by the smart gas data center.

The smart gas management platform refers to a platform that overall plans and coordinates the connection and collaboration between various functional platforms, gathers all the information of the IoT, and provides perception management and control management functions for an IoT operating system. For example, the smart gas management platform may obtain and provide gas maintenance management information, etc.

In some embodiments, the smart gas management platform may include a smart customer service management sub-platform, a smart operation management sub-platform, and a smart gas data center. Each management sub-platform may bi-directionally interact with the smart gas data center. The smart gas data center may summarize and store all the operating data of the IoT system. Each management sub-platform may obtain data from the smart gas data center and feed back relevant operation information. For example, the smart customer service management sub-platform may obtain customer feedback information from the smart gas data center, analyze and process the customer feedback information, and send analyzed and processed maintainer-related data to the smart gas data center, etc. The maintainer-related data may include maintainer evaluation information (e.g., an ability evaluation, a maintenance result evaluation, etc.) determined by processing the customer feedback information. As another example, the smart gas data center may send the maintainer-related data and gas device-related data to the smart operation management sub-platform for processing. The smart operation management sub-platform may send processed maintenance management information (e.g., management information of a pipeline network project, such as a personnel arrangement, scheduling, etc.) to the smart gas data center for summary, processing, and further sending to the smart gas service platform. In some embodiments, the smart customer service management sub-platform may be used for revenue management, industrial and commercial unit management, installation management, customer service management, message management, and customer analysis management. The message management may be used to view customer calls, inquiries, feedback, complaints, and other information. The customer service management may be used to respond to the customer feedback information. In some embodiments, the smart operation management sub-platform may be used for gas volume procurement management, gas volume reserve management, gas dispatching management, purchase and sales difference management, pipeline network project management, comprehensive office management, etc. The pipeline network project management may be used to view work order information, staffing, and progress of the pipeline network project as well as manage the pipeline network project. In some embodiments, the smart operation management sub-platform and the smart service management sub-platform may exchange information with the smart gas service platform and the smart gas sensor network platform through the smart gas data center. In some embodiments, the smart gas data center may receive the gas maintenance management information query instruction and the customer feedback information sent by the smart gas service platform, and upload the gas maintenance management information to the smart gas service platform. In some embodiments, the smart gas data center may send an instruction for obtaining the gas device-related data to the smart gas sensor network platform, and receive the gas device-related data uploaded by the smart gas sensor network platform.

The smart gas sensor network platform may be a functional platform for managing sensor communication. The smart gas sensor network platform may be configured as a communication network and gateway to implement functions such as network management, protocol management, instruction management, and data analysis. In some embodiments, the smart gas sensor network platform may include a gas indoor device sensor network sub-platform and a gas pipeline network device sensor network sub-platform, which correspond to a gas indoor device object sub-platform to obtain indoor device-related data and correspond to a gas pipeline network device object sub-platform to obtain pipeline network device-related data, respectively. In some embodiments, the smart gas sensor network platform may be connected with the smart gas management platform and the smart gas object platform to implement the functions of perceptional information sensor communication and control information sensor communication. For example, the smart gas sensor network platform may receive the instruction for obtaining the gas device-related data sent by the smart gas data center, upload the gas device-related data to the smart gas data center, send the instruction for obtaining the gas device-related data to the smart gas object platform, and receive the gas device-related data uploaded by the smart gas object platform.

The smart gas object platform may be a functional platform for perceptional information generation and control information execution, and may be configured as a gas device and other devices. The gas device may include an indoor device and a pipeline network device. The other devices may include a monitoring device, a temperature sensor, a pressure sensor, etc. In some embodiments, the smart gas object platform may also be provided with the gas indoor device object sub-platform and the gas pipeline network device object sub-platform. The gas indoor device object sub-platform may include the indoor device, such as a metering device of the gas user. The gas pipeline network device object sub-platform may include the pipeline network device, such as a pressure regulation device, a gas gate station compressor, a gas flow meter, a valve control device, a thermometer, a barometer, etc. In some embodiments, the smart gas object platform may receive the instruction for obtaining the gas device-related data sent by the smart gas sensor network platform upward, and upload the gas device-related data to the sensor network sub-platform.

It should be noted that the smart gas user platform in this embodiment may be a desktop computer, a tablet computer, a notebook computer, a mobile phone, or other electronic devices capable of data processing and communication, which is not limited herein. It should be understood that the data processing process mentioned in this embodiment may be processed by a processor of a server, and the data stored in the server may be stored in a storage device of the server, such as a hard disk. In a specific application, the smart gas sensor network platform may use a plurality of sets of gateway servers or a plurality of sets of intelligent routers, which are not limited herein. It should be understood that the data processing process mentioned in the embodiment of the present disclosure may be processed by a processor of a gateway server, and the data stored in the gateway server may be stored in a storage device of the gateway server, such as a hard disk and a Solid State Disk (SSD), etc.

In some embodiments of the present disclosure, the transmission or control of the customer feedback information, the gas device-related data, and emergency response plans for gas emergencies can be implemented through the IoT functional architecture of five platforms, and the closed loop of information flow can be completed, marking IoT information processing smoother and more efficient.

Figure 2:
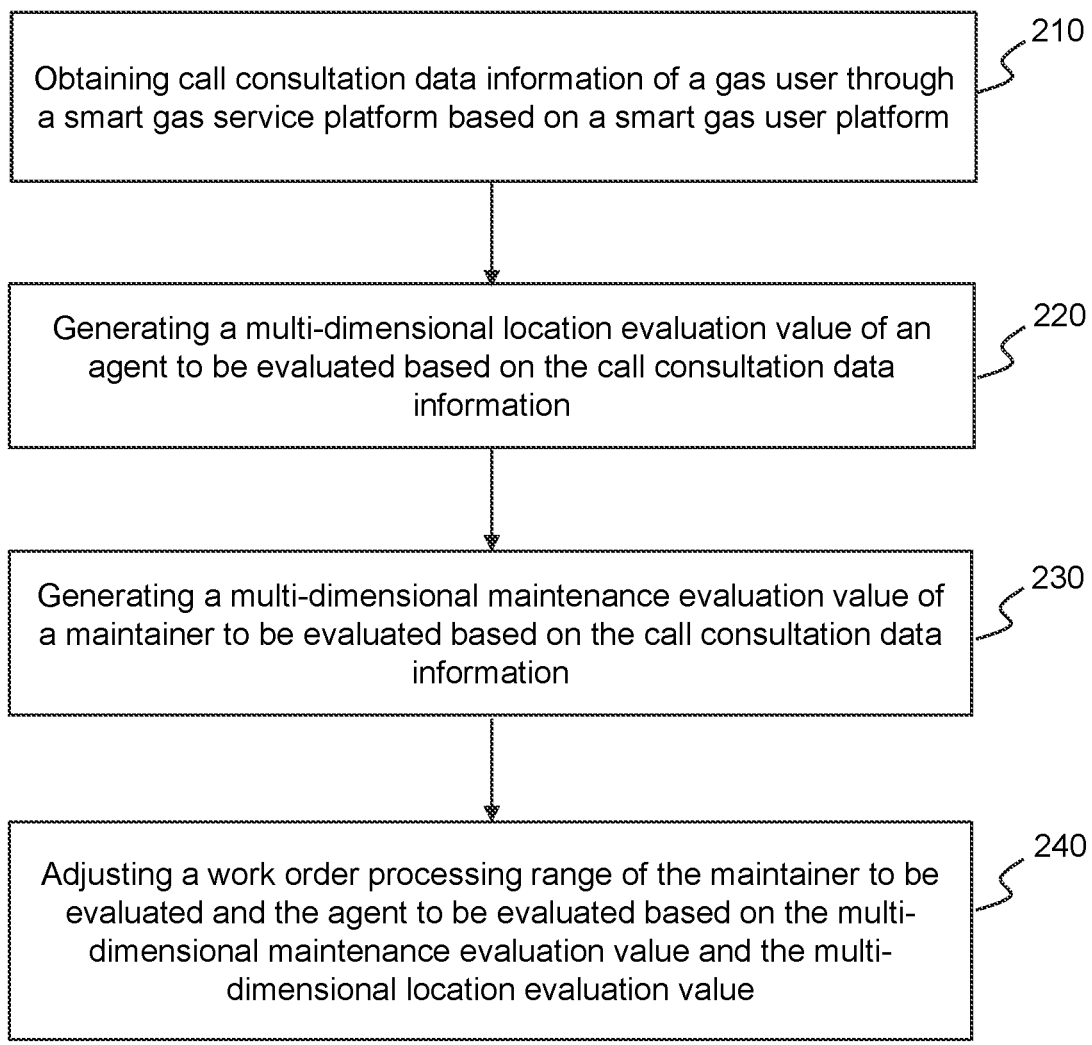
FIG. 2 is a flowchart illustrating an exemplary method for maintenance management of a smart gas call center according to some embodiments of the present disclosure.

FIG. 2 is a flowchart illustrating an exemplary method for maintenance management of a smart gas call center according to some embodiments of the present disclosure. In some embodiments, a process 200 may be performed by the smart gas management platform. As shown in FIG. 2, the process 200 may include the following operations 210-240.

In 210, obtaining call consultation data information of a gas user through the smart gas service platform based on the smart gas user platform.

The call consultation data information refers to data information related to a gas fault obtained through communication with the gas user. In some embodiments, the call consultation data information may include one or more of gas fault feature data, service personnel data, and gas customer feedback data.

The gas fault feature data refers to data capable of reflecting gas fault features. For example, the gas fault feature data may include a gas meter fault code, a gas fault time, or the like.

The service personnel data refers to personnel involved in the handling of the gas fault. For example, the service personnel may include an agent who answers a consultation call, a maintainer responsible for the maintenance of the gas fault, or the like.

The gas customer feedback data refers to data fed back by a gas customer based on the handling of the gas fault. For example, the gas customer feedback data may include evaluation data of the gas customer to the agent, evaluation data of the gas customer to the maintainer, or the like.

In some implementations, the call consultation data information may further include first associated data.

The first associated data refers to data associated with determining a gas fault type. In some embodiments, the first associated data may include one or more of gas usage feature information of the gas user, an average consumption rate of the gas user when using the gas, a calorific value of gas, or the like.

In some implementations, the first associated data may include at least gas usage feature information of the gas user.

The gas usage feature information of the gas user refers to features related to a gas usage of the gas user.

In some implementations, the gas usage feature information of the gas user may include a gas usage frequency of the gas user. The gas usage frequency refers to a ratio of a time period in which the gas usage rate is greater than a threshold to a total time period in which gas usage is counted.

In some embodiments, the smart gas data center in the smart gas management platform may obtain the call consultation data information through the smart gas service platform based on the smart gas user platform.

In 220, generating a multi-dimensional location evaluation value of an agent to be evaluated based on the call consultation data information.

The agent to be evaluated refers to an agent to be evaluated for locating the gas fault type. In some embodiments, the agent to be evaluated may locate the gas fault type based on the call consultation data information.

The location evaluation value refers to a value that reflects the ability of the agent to be evaluated to locate the gas fault type based on the call consultation data information.

In some embodiments, each dimension of a plurality of dimensions may correspond to a location complexity. For example, the plurality of dimensions may include three preset dimensions. The three preset dimensions may specifically include a preset work order processing range of being easy to locate the gas fault type, a preset work order processing range of being intermediately difficult to locate the gas fault type, and a preset work order processing range of being complex to locate the gas fault type. For the definition of the work order processing range, please refer to the description below, which is not repeated herein.

The multi-dimensional location evaluation value refers to a location evaluation value under a location complexity corresponding to each dimension of the plurality of dimensions.

In some embodiments, the location evaluation value of the each dimension of the plurality of dimensions of the agent to be evaluated may be manually evaluated based on the call consultation data information.

In some embodiments, the smart gas management platform may generate second data information from the call consultation data information, and then generate the multi-dimensional location evaluation value based on the second data information. The second data information may include relevant data information generated based on a fault location of the agent to be evaluated within a target time period. For more specific content of this part, please refer to the specific content of FIG. 4 below, which is not repeated herein.

In 230, generating a multi-dimensional maintenance evaluation value of a maintainer to be evaluated based on the call consultation data information.

The maintainer to be evaluated refers to a gas fault maintainer to be evaluated. In some embodiments, the maintainer be evaluated may perform maintenance based on the gas fault type.

The maintenance evaluation value refers to a value that reflects the ability of the maintainer to be evaluated to perform the maintenance based on the gas fault type.

In some embodiments, each dimension of the plurality of dimensions may correspond to a maintenance complexity. For example, the plurality of dimensions may include three preset dimensions. The three preset dimensions may specifically include a preset work order processing range of a simple maintenance task, a preset work order processing range of an intermediate maintenance task, and a preset work order processing range of a complex maintenance task.

In some embodiments, the maintenance evaluation value of the each dimension of the plurality of dimensions of the maintainer to be evaluated may be manually evaluated based on the call consultation data information.

In some embodiments, the smart gas management platform may generate first data information from the call consultation data information and generate the multi-dimensional maintenance evaluation value based on the first data information. The first data information may include relevant data information generated by the maintainer to be evaluated within a target time period. For more specific content of this part, please refer to the following FIG. 3 and the description thereof, which is not repeated herein.

In 240, adjusting a work order processing range of the maintainer to be evaluated and the agent to be evaluated based on the multi-dimensional maintenance evaluation value and the multi-dimensional location evaluation value.

A work order may be a simple maintenance plan consisting of one or more works. In some embodiments, the work order may correspond to an overall process including "a user calling for consultation based on a gas fault; an agent extracting abnormal features of the gas fault based on an inquiry and an answer of the user to the inquiry to implement a collection of abnormal information; the agent locating the gas fault based on collected abnormal information; and a maintainer performing gas fault maintenance on site (or remotely) based on a located fault."

The work order processing range refers to a work order receiving range. For example, a work order processing range of an agent A1 may be simple location tasks, and a work order processing range of an agent A2 may be intermediately difficult location tasks. As another example, a work order processing range of a maintainer B1 may be simple maintenance tasks, and a work order processing range of a maintainer B2 may be intermediate or complex maintenance tasks.

In some embodiments, the maintenance evaluation value of the each dimension of the plurality of dimensions of the maintainer to be evaluated may be determined, a maximum maintenance evaluation value may be determined, the location evaluation value of the each dimension of the plurality of dimensions of the agent to be evaluated may be determined, and a maximum location evaluation value may be determined based on historical data. If the current work order processing range corresponding to the maintainer to be evaluated is not within a dimension corresponding to the maximum maintenance evaluation value, the current work order processing range corresponding to the maintainer to be evaluated may be adjusted to be within the dimension corresponding to the maximum maintenance evaluation value. If the current work order processing range corresponding to the agent to be evaluated is not within a dimension corresponding to the maximum location evaluation value, the current work order processing range corresponding to the agent to be evaluated may be adjusted to be within the dimension corresponding to the maximum location evaluation value.

In some embodiments of the present disclosure, the multi-dimensional maintenance evaluation value and the multi-dimensional location evaluation value may be determined based on the call consultation data information of the gas user, thereby adjusting the work order processing range of the maintainer to be evaluated and the agent to be evaluated. In turn, the work order processing range of the maintainer to be evaluated and the agent to be evaluated can be more matched with their own abilities, the location accuracy and maintenance quality can be enhanced, the work order processing efficiency can be improved, and the satisfaction of gas users can be improved.

Figure 3:
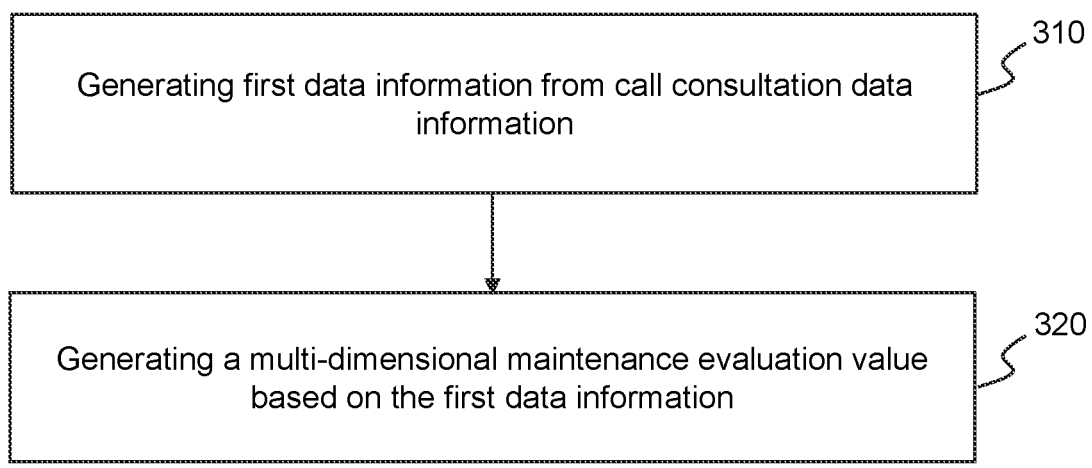
FIG. 3 is a flowchart illustrating an exemplary process for generating a multi-dimensional maintenance evaluation value of a maintainer to be evaluated according to some embodiments of the present disclosure.

FIG. 3 is a flowchart illustrating an exemplary process for generating a multi-dimensional maintenance evaluation value of a maintainer to be evaluated according to some embodiments of the present disclosure. In some embodiments, a process 300 may be performed by the smart gas management platform. As shown in FIG. 3, the process 300 may include the following operations 310-320.

In 310, generating first data information from call consultation data information.

The first data information refers to data information related to the ability of the maintainer to be evaluated. In some embodiments, the first data information may include relevant data information generated by the maintainer to be evaluated during maintenance within a target time period.

The target time period refers to a prescribed time period. For example, the target time period may be a previous month, previous two months, or a first half year, etc.

The relevant data information generated during maintenance refers to relevant data generated by the maintainer to be evaluated during one or more times of maintenance within the target time period. For example, the relevant data information generated during maintenance may include one or more of a maintenance complexity of each time of gas fault maintenance among all times of gas fault maintenance within the target time period, a total time spent on maintenance, a count of maintenance trips, a customer complaint situation (e.g., complaints, no complaints, etc.), and a time interval between a maintenance time and a complaint time, etc. For the definition of the maintenance complexity, please refer to the corresponding description below, which is not repeated herein.

In some embodiments, the smart gas management platform may screen the relevant data information generated by the maintainer to be evaluated during the maintenance within the target time period from the call consultation data information as the first data information.

In 320, generating a multi-dimensional maintenance evaluation value based on the first data information.

In some embodiments, the smart gas management platform may generate one or more maintenance feature vectors of the maintainer to be evaluated based on the first data information, and then generate the multi-dimensional maintenance evaluation value based on the one or more maintenance feature vectors.

The maintenance feature vectors refer to vectors constructed based on the first data information. In some embodiments, one maintenance feature vector may correspond to one maintenance.

In some embodiments, the smart gas management platform may construct the feature vectors based on the first data information in various ways. For example, the smart gas management platform may construct the maintenance feature vector (a1, a2, a3, a4, a5) based on the first data information. a1 may be the maintenance complexity of the maintenance, a2 may be the total maintenance time, a3 may be the count of maintenance trips, a4 may be the customer complaint situation (e.g., 1 means that there is a complaint, and 2 means that there is no complaint), and a5 may be the time interval between the maintenance time and the complaint time.

In some embodiments, the smart gas management platform may calculate a first maintenance evaluation value for each maintenance feature vector in each dimension based on the one or more maintenance feature vectors, and then generate the multi-dimensional maintenance evaluation value by performing a weighted summation on a plurality of first maintenance evaluation values obtained by calculating the one or more maintenance feature vectors in the each dimension.

In some embodiments, the dimension of the maintenance feature vector may be determined based on the maintenance complexity corresponding to the maintenance. For example, the dimension of the maintenance feature vector corresponding to a simple maintenance task may be a simple maintenance task dimension, the dimension of the maintenance feature vector corresponding to an intermediate maintenance task may be an intermediate maintenance task dimension, and the dimension of the maintenance feature vector corresponding to a complex maintenance task may be a complex maintenance task dimension.

The maintenance complexity refers to a degree of difficulty corresponding to each time of maintenance. For example, the maintenance complexity may include the simple maintenance task, the intermediately difficult maintenance task, and the complex maintenance task. In some embodiments, the maintenance complexity corresponding to the maintenance may be generated based on a gas fault distribution corresponding to the maintenance and a gas pipeline network complexity.

The gas fault distribution may include a count of different types of gas faults in historical gas faults of the gas user. For example, in the historical gas faults of a certain gas user, fault A occurred 5 times, fault B occurred 3 times, and fault C occurred 6 times, then the gas fault distribution of the gas user may be (5, 3, 6).

In some embodiments, if in the historical gas faults of the certain gas user, the count of faults A, B, C, etc., occurs on average, and the time distribution is also irregular (relatively random), then the gas fault distribution may be relatively complex, and the maintenance complexity may be considered to be relatively high. Because the maintenance for the gas user may involve the maintenance of various faults, any gas faults may be possible for a work order received from the gas user in the future.

In some embodiments, if only fault A occurred in the historical gas faults of the certain gas user, the gas fault distribution may be relatively singular, and the maintenance complexity may be considered to be very low. Because the maintenance for the gas user only involves the maintenance of fault A, and the work order received from the gas user in the future is also likely to be fault A, the maintainer may perform the maintenance on the fault based on past maintenance experience completely.

The gas pipeline network complexity may be determined based on a gas source distribution density, a count of pipeline branches, and a total length of transmission and distribution pipelines of the pipeline network of the gas user and an upstream transmission and distribution pipeline network thereof. In some embodiments, the higher the gas source distribution density is, the more the pipeline branches are, and the longer the total length of the transmission and distribution pipelines is, the greater the gas pipeline network complexity may be.

In some embodiments, the smart gas management platform may establish a first query table of maintenance complexities corresponding to different gas fault distributions and gas pipeline network complexities based on the historical data, and then determine the maintenance complexities corresponding to the different gas fault distributions and the gas pipeline network complexities by searching the first query table, thereby determining the dimension of the maintenance feature vector.

The first maintenance evaluation value refers to a value that reflect the ability of maintenance of the maintainer to be evaluated in a maintenance task.

In some embodiments, the first maintenance evaluation value may be obtained using various calculation manners. For example, the calculation formula of the first maintenance evaluation value may be:

$$k = k1 \times a1 - k2 \times a2 - k3 \times a3 - k4 \times a4 + k5 \times a5$$

a1 may be the maintenance complexity in a maintenance task, a2 may be the total time spent on the maintenance, a3 may be the count of maintenance trips, a4 may be the customer complaint situation of the maintenance (e.g., 1 means that there is a complaint, and 2 means that there is no complaint), a5 may be the time interval between the maintenance time and the complaint time, k5 may be the gas usage frequency in the first associated data of the maintenance, and k1, k2, k3, and k4 may be preset values. The preset values may be set by those skilled in the art based on experience. The gas usage frequency refers to a count of times the gas user uses gas within a preset time. For example, if the gas usage frequency of user A is once a month, k5 may be substituted with 1. As another example, the calculation formula of the first maintenance evaluation value may be:

$$k = a1 \times (k2 \times a2 - k3 \times a3 - k4 \times a4 + k5 \times a5)$$

In some embodiments, the smart gas management platform may perform the weighted summation on the plurality of first maintenance evaluation values generated by calculating the one or more the maintenance feature vectors in each dimension to generate the multi-dimensional maintenance evaluation value.

In some embodiments, a weight of the weighted summation may be related to a location accuracy of a location feature vector. The location accuracy of the location feature vector may correspond to a maintenance feature vector corresponding to the first maintenance evaluation value.

In some embodiments, the higher the location accuracy of the location feature vector corresponding to a certain maintenance is, the greater the weight corresponding to the first maintenance evaluation value of the maintenance feature vector corresponding to the maintenance may be.

In some embodiments of the present disclosure, the higher the location accuracy is, the lower the impact on the maintenance evaluation due to inaccurate location may be, so that the corresponding maintenance feature vector may more accurately reflect the ability of the maintainer. Therefore, the weight of the weighted summation may be related to the location accuracy of the location feature vector, and the weight of the first maintenance evaluation value of the maintenance feature vector corresponding to the location feature vector with a higher location accuracy may be set higher to make the determined maintenance evaluation value more accurate.

In some embodiments of the present disclosure, the multi-dimensional evaluation value may be determined based on the call consultation data information of the gas user, thereby adjusting the work order processing range of the maintainer to be evaluated. In this way, the work order processing range of the maintainer to be evaluated can be more matched with their own abilities, and the maintenance quality, work order processing efficiency, and satisfaction of gas users can be improved.

Figure 4:
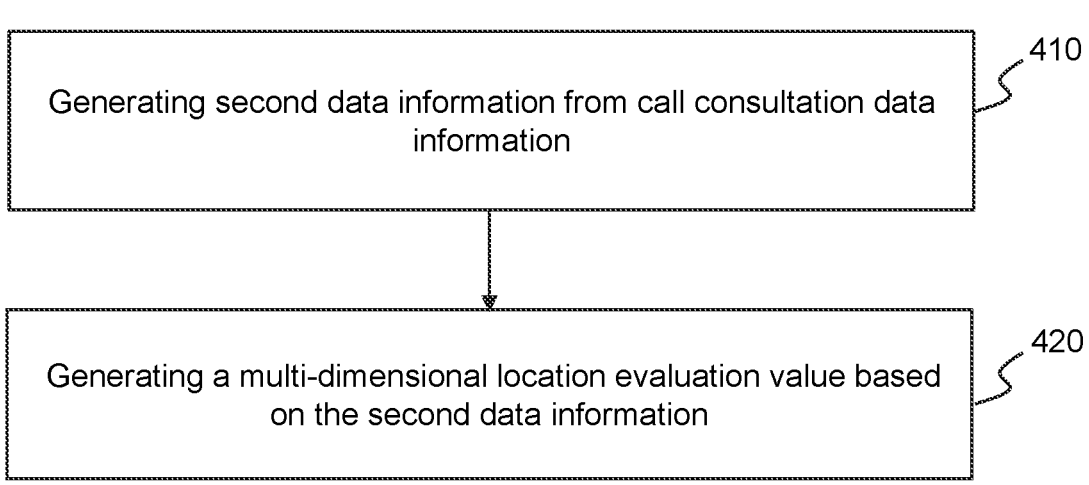
FIG. 4 is a flowchart illustrating an exemplary process for generating a multi-dimensional location evaluation value of an agent to be evaluated according to some embodiments of the present disclosure.

FIG. 4 is a flowchart illustrating an exemplary process for generating a multi-dimensional location evaluation value of an agent to be evaluated according to some embodiments of the present disclosure. In some embodiments, a process 400 may be performed by a smart gas management platform. As shown in FIG. 4, the process 400 may include the following operations 410-420.

In 410, generating second data information from call consultation data information.

The second data information refers to data information related to a location ability of the agent to be evaluated. In some embodiments, the second data information may include relevant data information generated by the agent to be evaluated during fault location within a target time period.

The relevant data information generated during the fault location refers to relevant data information generated during a process of fault location corresponding to each work order in one or more work orders processed by the agent to be evaluated within the target time period. For example, the relevant data information generated during the fault location may include a count of features extracted from a user side by the agent to be evaluated during a fault location process corresponding to each time of maintenance, a call communication time between the agent to be evaluated and the user, a model output ambiguity, a customer complaint situation (e.g., 1 means that there is a complaint, and 2 means that there is no complaint), a gas fault distribution, etc. For the definition of the gas fault distribution, please refer to FIG. 3 and related description thereof, which is not repeated herein.

For the definition of the model output ambiguity, please refer to the related description below, which is not repeated herein.

The count of features extracted from the user side by the agent to be evaluated refers to a count of gas feature data extracted by the agent to be evaluated through communication with the gas user. For example, the count of features extracted by the agent to be evaluated from the user side may be 1, 2, or 3, etc.

In some embodiments, the smart gas management platform may screen the relevant data information generated by the agent to be evaluated during the fault location within the target time period from the call consultation data information as the second data information.

In 420, generating a multi-dimensional location evaluation value based on the second data information.

In some embodiments, the smart gas management platform may generate one or more location feature vectors of the agent to be evaluated based on the second data information, and then generate the multi-dimensional location evaluation values based on the one or more location feature vectors.

The location feature vectors refer to vectors constructed based on the second data information. In some embodiments, one location feature vector may correspond to one fault location.

In some embodiments, the smart gas management platform may construct the location feature vectors based on the second data information in various ways. For example, the smart gas management platform may construct the location feature vector (b1, b2, b3, b4, b5) based on the second data information. b1 may represent the count of features extracted from the user side by the agent to be evaluated during one maintenance, b2 may be the call communication time between the agent to be evaluated and the user, b3 may be the model output ambiguity, b4 may be the customer complaint situation (e.g., 1 means that there is a complaint, and 2 means that there is no complaint), and b5 may be the gas fault distribution. For the definition of the model output ambiguity, please refer to the following FIG. 5 and the description thereof, which is not repeated herein. For the definition of the gas fault distribution, please refer to the above FIG. 3 and the description thereof, which is not repeated herein.

In some embodiments, the smart gas management platform may calculate first location evaluation value and location accuracy for each location feature vector in each dimension based on one or more location feature vectors, and then perform a weighted summation on a plurality of first location evaluation values calculated by the one or more location feature vectors in the each dimension to generate the multi-dimensional location evaluation value.

In some embodiments, the dimension of the location feature vector may be determined based on the location complexity corresponding to the location. For example, the dimension of the location feature vector corresponding to a simple location task may be a simple positioning task dimension, the dimension of the location feature vector corresponding to an intermediate difficulty location task may be an intermediately difficult location task dimension, and the dimension of the location feature vector corresponding to a complex location task may be a complex location task dimension.

The location complexity refers to a degree of difficulty of locating the gas fault type corresponding to each fault location. For example, the location complexity may include the simple location task, the intermediately difficult location task, and the complex location task.

In some embodiments, the location complexity corresponding to the location may be generated based on the model output ambiguity corresponding to the location feature vector and the gas fault distribution.

The model output ambiguity may be a value that reflects an ambiguity of a fault type generated by a gas fault prediction model. In some embodiments, the greater a sum of differences between an element maximum value and other element values in multi-dimensional probability vectors output by the gas fault prediction model is, the lower the ambiguity of the gas fault prediction model may be. In some embodiments, the sum of the differences between the element maximum value and the other element values in the multi-dimensional probability vectors output by the gas fault prediction model may be calculated, and then the model output ambiguity may be determined. For example, if the output vector of the gas fault prediction model is: (0.05, 0.05, 0.8, 0.05, 0.05), then model output ambiguity may be determined as:

$$y1=(0.8-0.05)+(0.8-0.05)+(0.8-0.05)+(0.8-0.05)=3$$

In this output case, the probability of the third type of fault may be 0.8, which is much higher than other types, and the output ambiguity of the gas fault prediction model may be low. As another example, if the output vector of the gas fault prediction model is: (0.2, 0.3, 0.2, 0.1, 0.2), then the model output ambiguity may be determined as:

$$y2=(0.3-0.2)+(0.3-0.3)+(0.3-0.2)+(0.3-0.1)+(0.3-0.2)=0.5$$

In this output case, the probability of various faults may be relatively close, whereby it is difficult to determine the specific fault, and the output ambiguity of the gas fault prediction model may be relatively high.

In some embodiments, a second query table of location complexities corresponding to different model output ambiguities and gas fault distributions may be established based on historical data, and then the location complexities corresponding to different model output ambiguities and gas fault distributions may be determined by searching the second query table to determine the dimension of the location feature vector.

In some embodiments, the dimension of the location feature vector may be generated based on clustering. Elements in cluster feature vectors of clustering may include a model output ambiguity, a gas fault distribution, user-side gas feature data and a gas user type. A count of clustering categories may be a preset value (e.g., 3, 4, etc.).

The user-side gas feature data refers to user-side gas usage features extracted by the agent to be evaluated through communication with the gas user. For example, the user-side gas feature data may include a flame appearance of user gas, whether there is any abnormal sound during the use of user gas, whether there is any peculiar smell during the use of user gas, ambient temperature during the use of user gas, etc.

The gas user type refers to a type of the gas user. For example, the gas user type may include a residential gas user, a commercial gas user, and an industrial gas user.

In some embodiments, the dimension of the location feature vector may be generated by clustering (e.g., k-means clustering, mean shift clustering, etc.) the cluster feature vectors based on the model output ambiguity, the gas fault distribution, the gas usage features of the gas user, and the gas user type. After clustering, the location feature vectors corresponding to the cluster feature vectors in each cluster may belong to one dimension.

In some embodiments of the present disclosure, clustering the feature vectors may quickly determine the dimension of the location feature vector.

The first location evaluation value refers to a location evaluation value corresponding to one fault location of the agent to be evaluated.

The location accuracy refers to closeness between a predicted gas fault type determined by the agent to be evaluated and an actual gas fault type in a fault location.

In some embodiments, the smart gas management platform may obtain the first location evaluation value using various calculation manners. For example, the calculation formula of the first location evaluation value may be:

$$h = c1 \times b1 - c2 \times b2 - c3 \times b3 - c4 \times b4 - c5 \times b5$$

b1 may be a count of features extracted from the user side by the agent to be evaluated during a maintenance, b2 may be a call communication time between the agent to be evaluated and the user, b3 may be a model output ambiguity, b4 may be a customer complaint situation (e.g., 1 means that there is a complaint, 2 means that there is no complaint), b5 may be a gas fault distribution, and c1, c2, c3, c4, and c5 may be preset coefficients. The preset coefficients may be set empirically by those skilled in the art. As another example, the calculation formula of the first location evaluation value may be:

$$h = b3 \times (c1 \times b1 - c2 \times b2 - c4 \times b4 - c5 \times b5)$$

In some embodiments, the smart gas management platform may determine user-side gas feature data, gas composition features, gas entry features, and gas upstream transportation features based on second data information. Then, the user-side gas feature data, the gas composition features, the gas entry features, and the gas upstream transportation features may be input into a gas fault prediction model, and a predicted gas fault type may be output by processing the user-side gas feature data, the gas composition features, the gas entry features, and the gas upstream transportation features using the gas fault prediction model. The gas fault prediction model may be a machine learning model. Finally, the location accuracy may be generated based on the predicted gas fault type and the actual gas fault type. For more specific content of this part, please refer to FIG. 5 and description thereof below, which is not repeated herein.

In some embodiments of the present disclosure, work order processing range of the agent to be evaluated may be adjusted by determining the multi-dimensional location evaluation values based on the call consultation data information of the gas user. In this way, the work order processing range of the agent to be evaluated can be more matched with his own ability, the location accuracy can be enhanced to help the maintainer to be evaluated to carry out efficient and rapid maintenance for accurately located gas faults, thereby improving the work order processing efficiency and improving the satisfaction of gas users.

Figure 5:
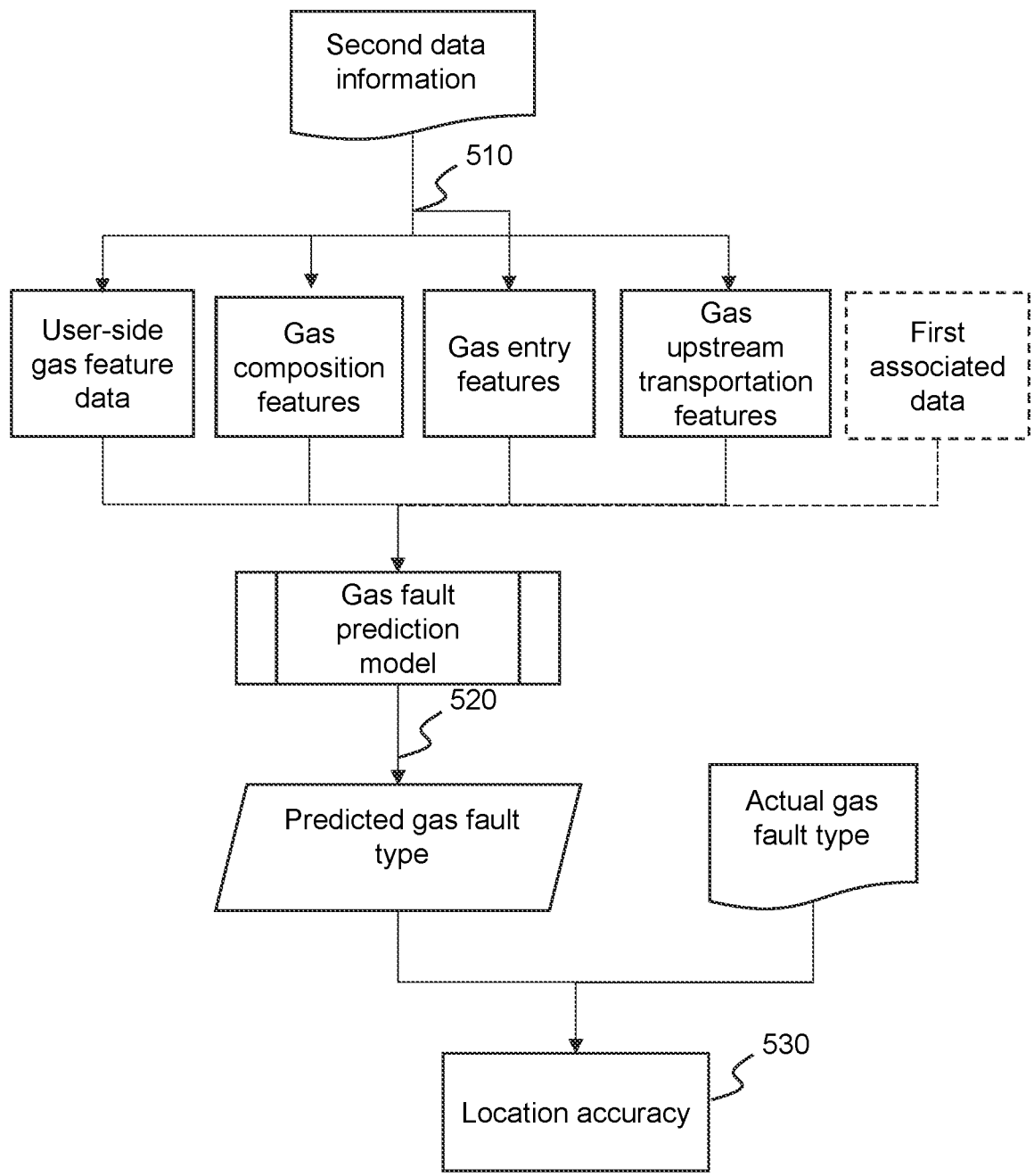
FIG. 5 is a flowchart illustrating an exemplary process for generating a location accuracy according to some embodiments of the present disclosure.

FIG. 5 is a flowchart illustrating an exemplary process for generating a location accuracy according to some embodiments of the present disclosure.

In some embodiments, a process 500 may be performed by the smart gas management platform. As shown in FIG. 5, the process 500 may include the following operations 510-530.

In 510, determining user-side gas feature data, gas composition features, gas entry features, and gas upstream transportation features based on second data information.

In some embodiments, the user-side gas feature data may be multi-dimensional data within a preset dimension. In some embodiments, the agent to be evaluated may ask the gas user from vision (e.g., gas flame appearance of a user, etc.), hearing (e.g., whether there is any abnormal sound during the gas use of a user, etc.), smell (e.g., whether there is any abnormal smell during the gas use of a user, etc.), and touch (e.g., ambient temperature during the gas use of a user, etc.). The user-side gas feature data may be constructed based on the user's answer.

The gas composition features refer to gas composition. In some embodiments, the gas composition may be analyzed based on an existing common gas composition analysis manner (e.g., gas chromatography).

The gas entry features refer to the pressure, flow velocity, and temperature of gas at a plurality of points in a gas entry section. In some embodiments, the smart gas management platform may directly obtain the gas entry features from the second data information.

The gas upstream transportation features refer to the pressure, flow velocity, and temperature of gas at the plurality of points in an upstream gas transportation section. In some embodiments, the smart gas management platform may directly obtain the gas upstream transportation features from the second data information.

In 520, inputting user-side gas feature data, gas composition features, gas entry features, and gas upstream transportation features into a gas fault prediction model, and outputting a predicted gas fault type by processing the user-side gas feature data, the gas composition features, the gas entry features, and the gas upstream transportation features using the gas fault prediction model, and the gas fault prediction model being a machine learning model.

In some embodiments, the gas fault prediction model may determine the predicted gas fault type based on the user-side gas feature data, the gas composition features, the gas entry features, and the gas upstream transportation features. In some embodiments, the gas fault prediction model may be the machine learning model, such as a neural network model (NN), a deep neural network model (DNN), etc., or any combination thereof.

In some embodiments, an input of the gas fault prediction model may include the user-side gas feature data, the gas composition features, the gas entry features, and the gas upstream transportation features. For example, the input of the gas fault prediction model may be a vector constructed based on the user-side gas feature data, the gas composition features, the gas entry features, and the gas upstream transportation features.

In some embodiments, the input of the gas fault prediction model may further include first associated data. The first associated data may include gas usage feature information of the gas user. For the definition of the gas usage feature information of the gas user, please refer to FIG. 2 and description thereof above, which is not repeated herein.

In some embodiments, an output of the gas fault prediction model may be the predicted gas fault type.

In some embodiments, the gas fault prediction model may be trained based on a plurality of labeled training samples.

The training samples may include the user-side gas feature data, the gas composition features, the gas entry features, and the gas upstream transportation features of historical gas users. Training labels may include known gas fault types of the historical gas users. In some embodiments, the training labels may be obtained through historical data stored in the smart gas data center or through manual labelling.

In some embodiments, the training samples may also include the first associated data of the historical gas users.

In some embodiments, a plurality of labeled training samples may be input into an initial gas fault prediction model, and a loss function may be constructed through the labels and the results of the initial gas fault prediction model. A trained gas fault prediction model may be obtained by iteratively updating parameters of the initial gas fault prediction model through gradient descent or other manners based on the loss function. When a preset condition is satisfied, the model training may be completed, and the trained gas fault prediction model may be obtained. The preset condition may be that the loss function converges, a count of iterations reaches a threshold, or the like.

In 530, generating a location accuracy based on the predicted gas fault type and an actual gas fault type.

The actual gas fault type refers to a gas fault type actually confirmed by the maintainer to be evaluated on site in the historical data.

In some embodiments, the smart gas management platform may use a negative number of a Euclidean distance between the predicted gas fault type obtained by the gas fault prediction model and the actual gas fault type corresponding to the maintenance as the location accuracy. For example, if an output vector of the gas fault prediction model is: (0.05, 0.05, 0.8, 0.05, 0.05), and a vector of the actual gas fault type corresponding to the maintenance is (0, 0, 1, 0, 0), then the location accuracy may be −0.22

$$\left(-\sqrt{(0.05-0)^2+(0.05-0)^2+(0.8-1)^2+(0.05-0)^2+(0.05-0)^2}\right).$$

As another example, if the output vector of the gas fault prediction model is: (0.2, 0.3, 0.2, 0.1, 0.2), and the vector of the actual gas fault type corresponding to the maintenance is (0, 1, 0, 0, 0), then the location accuracy may be −0.79

$$\left(-\sqrt{(0.2-0)^2+(0.3-1)^2+(0.2-0)^2+(0.1-0)^2+(0.2-0)^2}\right).$$

In some embodiments, the location accuracy may also be related to the corresponding model output ambiguity in the location feature vector. For example, the lower the model output ambiguity is, the lower the location accuracy may be.

In some embodiments of the present disclosure, the lower the model output ambiguity is, the more accurate the fault given by the model may be. If the location error still occurs, it may represent that the features extracted by the agent have a high probability of being wrong, resulting in wrong results of the model based on wrong input, thus reducing the location accuracy. The determined location accuracy may be more accurate by considering the corresponding model output ambiguity in the location feature vector.

In some embodiments of the present disclosure, the accurate predicted gas fault type can be obtained more quickly through the gas fault prediction model to determine the accurate location accuracy.

The present disclosure includes a non-transitory computer-readable storage medium storing computer instructions. When the computer instructions are executed by a processor, the method for maintenance management of the smart gas call center may be implemented.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for maintenance management of a smart gas call center, implemented based on an Internet of Things (IoT) system for maintenance management of a smart gas call center, wherein the IoT system includes a smart gas user platform, a smart gas service platform, a smart gas management platform, a smart gas sensor network platform, and a smart gas object platform which interact in sequence, wherein the smart gas management platform includes a smart customer service management sub-platform, a smart operation management sub-platform, and a smart gas data center, the smart customer service management sub-platform bidirectionally interacts with the smart gas data center, the smart operation management sub-platform bidirectionally interacts with the smart gas data center, and the smart customer service management sub-platform and the smart operation management sub-platform obtain data from the smart gas data center and feedback corresponding operation information;

the smart gas user platform includes a gas user sub-platform, a government user sub-platform, and a supervision user sub-platform, the gas user sub-platform corresponds to a gas user, the government user sub-platform corresponds to a government user, and the supervision user sub-platform corresponds to a supervision user;

the smart gas service platform includes a smart gas usage service sub-platform, a smart operation service sub-platform, and a smart supervision service sub-platform, the smart gas usage service sub-platform corresponds to the gas user sub-platform, the smart operation service sub-platform corresponds to the government user sub-platform, and the smart supervision service sub-platform corresponds to the supervision user sub-platform;

the smart gas object platform includes a gas indoor device object sub-platform and a gas pipeline network device object sub-platform, the gas indoor device object sub-platform includes a metering device of the gas user, the gas pipeline network device object sub-platform includes at least one of a pressure regulation device, a gas gate station compressor, a gas flow meter, a valve control device, a thermometer, and a barometer; and the method is performed by a processor of the smart gas management platform, the method comprising:

obtaining a call consultation data information of the gas user through the smart gas service platform based on the smart gas user platform and the smart gas object platform;

generating a second data information from the call consultation data information, the second data information including relevant data information generated by a fault location of an agent to be evaluated within a target time period;

generating one or more location feature vectors of the agent to be evaluated based on the second data information;

calculating a first location evaluation value and a location accuracy for each location feature vector in each dimension based on the one or more location feature vectors; and performing a weighted summation on a plurality of first location evaluation values obtained by calculating the one or more location feature vectors in the each dimension to generate a multi-dimensional location evaluation value, a weight of the weighted summation being related to a corresponding location accuracy, a dimension of a maintenance feature vector being determined based on a location complexity corresponding to the fault location, and the location complexity corresponding to the fault location being generated based on a model output ambiguity corresponding to the each location feature vector and a gas fault distribution, wherein each of a plurality of dimensions corresponds to the location complexity, each of the one or more location feature vectors corresponds to the fault location, and the agent to be evaluated locates a gas fault type based on the call consultation data information, wherein a manner for generating the location accuracy includes:

determining user-side gas feature data, gas composition features, gas entry features, and gas upstream transportation features based on the second data information, the gas composition features referring to a gas composition, the gas entry features referring to pressure, flow velocity, and a temperature of gas at a plurality of points in a gas entry section, the gas upstream transportation features referring to pressure, flow velocity, and a temperature of gas at a plurality of points in an upstream gas transportation section, wherein the gas composition features, the gas entry features, and the gas upstream transportation features are obtained by the gas flow meter, the thermometer, and the barometer of the smart gas object platform;

inputting the user-side gas feature data, the gas composition features, the gas entry features, and the gas upstream transportation features into a gas fault prediction model, and processing the user-side gas feature data, the gas composition features, the gas entry features, and the gas upstream transportation features using the gas fault prediction model to output a predicted gas fault type, the gas fault prediction model being a machine learning model, wherein the gas fault prediction model is trained based on a plurality of labeled training samples, the training samples include the user-side gas feature data, the gas composition features, the gas entry features, and the gas upstream transportation features of historical gas users, training labels include known gas fault types of the historical gas users, wherein a training process of the gas fault prediction model includes:

inputting the plurality of labeled training samples into an initial gas fault prediction model;

constructing a loss function through the training labels and output of the initial gas fault prediction model;

iteratively updating parameters of the initial gas fault prediction model through gradient descent based on the loss function to obtain a trained gas fault prediction model; and completing model training and obtaining the trained gas fault prediction model until the loss function of the initial gas fault prediction model meeting a preset condition, wherein the preset iteration condition includes convergence of the loss function and a number of iterations reaching a threshold; and generating the location accuracy based on the predicted gas fault type and an actual gas fault type;

generating a multi-dimensional maintenance evaluation value of a maintainer to be evaluated based on the call consultation data information, wherein the maintainer to be evaluated performs maintenance based on the gas fault type;

adjusting a work order processing scope of the maintainer to be evaluated and the agent to be evaluated based on the multi-dimensional maintenance evaluation value and the multi-dimensional location evaluation value; and managing a pipeline network project by the smart operation management sub-platform based on the adjusted work order processing scope of the maintainer to be evaluated and the agent to be evaluated.

2. The method of claim 1, wherein the generating a multi-dimensional maintenance evaluation value of a maintainer to be evaluated based on the call consultation data information includes:

generating first data information from the call consultation data information, the first data information including relevant data information generated by maintenance of the maintainer to be evaluated within the target time period; and generating the multi-dimensional maintenance evaluation value based on the first data information.

3. The method of claim 1, wherein the call consultation data information further includes first associated data, the first associated data includes at least one of gas usage feature information of the gas user, an average consumption rate of the gas user when using the gas, and a calorific value of the gas, and the gas usage feature information of the gas user includes a gas usage frequency of the gas user.

4. The method of claim 2, wherein the generating the multi-dimensional maintenance evaluation value based on the first data information includes:

generating one or more maintenance feature vectors of the maintainer to be evaluated based on the first data information; and generating the multi-dimensional maintenance evaluation value based on the one or more maintenance feature vectors.

5. The method of claim 4, wherein each of a plurality of dimensions corresponds to a maintenance complexity, each of the one or more maintenance feature vectors corresponds to one maintenance, and the generating the multi-dimensional maintenance evaluation value based on the one or more maintenance feature vectors includes:

calculating a first maintenance evaluation value for the each maintenance feature vector in the each dimension based on the one or more maintenance feature vectors; and performing a weighted summation on a plurality of first maintenance evaluation values obtained by calculating the one or more maintenance feature vectors in the each dimension to generate the multi-dimensional maintenance evaluation value, a dimension of the each maintenance feature vector being determined based on a maintenance complexity corresponding to the maintenance, and the maintenance complexity corresponding to the maintenance being generated based on a gas fault distribution corresponding to the maintenance and a gas pipeline network complexity, wherein the gas fault distribution includes a count of different types of gas faults in historical gas faults of the gas user, and the gas pipeline network complexity is determined based on a gas source distribution density, a count of pipeline branches, and a total length of transmission and distribution pipelines of the pipeline network of the gas user and an upstream transmission and distribution pipeline network thereof.

6. The method of claim 5, wherein a weight of the weighted summation is related to a location accuracy of a location feature vector, and the location accuracy of the location feature vector corresponds to the maintenance feature vector corresponding to the first maintenance evaluation value.

7. The method of claim 1, wherein the inputting the user-side gas feature data, the gas composition features, the gas entry features, and the gas upstream transportation features into the gas fault prediction model, and processing the user-side gas feature data, the gas composition features, the gas entry features, and the gas upstream transportation features using the gas fault prediction model to output a predicted gas fault type includes:
inputting the user-side gas feature data, the gas composition features, the gas entry features, and the gas upstream transportation features, and first associated data into the gas fault prediction model, and processing the user-side gas feature data, the gas composition features, the gas entry features, and the gas upstream transportation features, and the first associated data using the gas fault prediction model to output the predicted gas fault type.

8. The method of claim 1, wherein the location accuracy is also related to the model output ambiguity corresponding to the each location feature vector.

9. The method of claim 1, wherein the dimensions of the location feature vectors are generated based on clustering, and elements in clustering feature vectors include the model output ambiguity, the gas fault distribution, the user-side gas feature data, and a gas user type.

10. An Internet of Things (IoT) system for maintenance management of a smart gas call center, comprising a smart gas user platform, a smart gas service platform, a smart gas management platform, a smart gas sensor network platform, and a smart gas object platform which interact in sequence, wherein
the smart gas management platform includes a smart customer service management sub-platform, a smart operation management sub-platform, and a smart gas data center, the smart customer service management sub-platform bidirectionally interacts with the smart gas data center, the smart operation management sub-platform bidirectionally interacts with the smart gas data center, and the smart customer service management sub-platform and the smart operation management sub-platform obtain data from the smart gas data center and feedback corresponding operation information;
the smart gas user platform includes a gas user sub-platform, a government user sub-platform, and a supervision user sub-platform, the gas user sub-platform corresponds to a gas user, the government user sub-platform corresponds to a government user, and the supervision user sub-platform corresponds to a supervision user;
the smart gas service platform includes a smart gas usage service sub-platform, a smart operation service sub-platform, and a smart supervision service sub-platform, the smart gas usage service sub-platform corresponds to the gas user sub-platform, the smart operation service sub-platform corresponds to the government user sub-platform, and the smart supervision service sub-platform corresponds to the supervision user sub-platform; and
the smart gas object platform includes a gas indoor device object sub-platform and a gas pipeline network device object sub-platform, the gas indoor device object sub-platform includes a metering device of the gas user, the gas pipeline network device object sub-platform includes at least one of a pressure regulation device, a gas gate station compressor, a gas flow meter, a valve control device, a thermometer, and a barometer;
wherein the smart gas management platform is configured to:
obtain a call consultation data information of the gas user through the smart gas service platform based on the smart gas user platform and the smart gas object platform;
generate a second data information from the call consultation data information, the second data information include relevant data information generated by a fault location of an agent to be evaluated within a target time period;
generate one or more location feature vectors of the agent to be evaluated based on the second data information;
calculate a first location evaluation value and a location accuracy for each location feature vector in each dimension based on the one or more location feature vectors; and
perform a weighted summation on a plurality of first location evaluation values obtained by calculating the one or more location feature vectors in the each dimension to generate a multi-dimensional location evaluation value, a weight of the weighted summation is related to a corresponding location accuracy, a dimension of a maintenance feature vector is determined based on a location complexity corresponding to the fault location, and the location complexity corresponding to the fault location is generated based on a model output ambiguity corresponding to the each location feature vector and a gas fault distribution, wherein each of a plurality of dimensions corresponds to the location complexity, each of the one or more location feature vector corresponds to the fault location, and the agent to be evaluated locates a gas fault type based on the call consultation data information,
wherein a manner for generating the location accuracy includes:
determining user-side gas feature data, gas composition features, gas entry features, and gas upstream transportation features based on the second data information, wherein the gas composition features refer to a gas composition, the gas entry features refer to pressure, flow velocity, and a temperature of gas at a plurality of points in a gas entry section, the gas upstream transportation features refer to pressure, flow velocity, and a temperature of gas at a plurality of points in an upstream gas transportation section, and the gas composition features, the gas entry features, and the gas upstream transportation features are obtained by the gas flow meter, the thermometer and the barometer of the smart gas object platform;

inputting the user-side gas feature data, the gas composition features, the gas entry features, and the gas upstream transportation features into a gas fault prediction model, and processing the user-side gas feature data, the gas composition features, the gas entry features, and the gas upstream transportation features using the gas fault prediction model to output a predicted gas fault type, the gas fault prediction model being a machine learning model, wherein the gas fault prediction model is trained based on a plurality of labeled training samples, the training samples include the user-side gas feature data, the gas composition features, the gas entry features, and the gas upstream transportation features of historical gas users, training labels include known gas fault types of the historical gas users, wherein a training process of the gas fault prediction model includes:

inputting the plurality of labeled training samples into an initial gas fault prediction model;

constructing a loss function through the training labels and output of the initial gas fault prediction model;

iteratively updating parameters of the initial gas fault prediction model through gradient descent based on the loss function to obtaining a trained gas fault prediction model; and completing model training and obtaining the trained gas fault prediction model until the loss function of the initial gas fault prediction model meeting a preset condition, wherein the preset iteration condition includes convergence of the loss function and a number of iterations reaching a threshold; and generating the location accuracy based on the predicted gas fault type and an actual gas fault type;

generate a multi-dimensional maintenance evaluation value of a maintainer to be evaluated based on the call consultation data information;

adjust a work order processing scope of the maintainer to be evaluated and the agent to be evaluated based on the multi-dimensional maintenance evaluation value and the multi-dimensional location evaluation value; and manage a pipeline network project by the smart operation management sub-platform based on the adjusted work order processing scope of the maintainer to be evaluated and the agent to be evaluated.

11. The IoT system of claim 10, wherein to generate a multi-dimensional maintenance evaluation value of a maintainer to be evaluated based on the call consultation data information, the smart gas management platform is further configured to:

generate first data information from the call consultation data information, the first data information including relevant data information generated by maintenance of the maintainer to be evaluated within the target time period; and generate the multi-dimensional maintenance evaluation value based on the first data information.

12. A non-transitory computer-readable storage medium storing computer instructions, wherein when the computer instructions are executed by a processor, the method of claim 1 is implemented.

* * * * *